United States Patent
Okumura et al.

[11] Patent Number: 5,860,748
[45] Date of Patent: Jan. 19, 1999

[54] SEALING DEVICE FOR ROLLER BEARING

[75] Inventors: Tsuyoshi Okumura, Nara-ken; Yoshitaka Nakagawa, Osaka; Mitsuru Wakabayashi, Nara-ken, all of Japan

[73] Assignees: Koyo Seiko Co., Ltd.; Toyo Seal Industries Co., Ltd., both of Japan

[21] Appl. No.: 887,818

[22] Filed: Jul. 3, 1997

[30] Foreign Application Priority Data

Jul. 5, 1996 [JP] Japan ................................ 8-195298

[51] Int. Cl.$^6$ ............................. F16C 33/78; F16J 15/32
[52] U.S. Cl. ........................... 384/486; 277/562; 277/914
[58] Field of Search ..................... 384/484, 486, 384/480, 478; 277/914, 562

[56] References Cited

U.S. PATENT DOCUMENTS

| | | | |
|---|---|---|---|
| 3,572,857 | 3/1971 | Hasegawa | 384/486 X |
| 4,191,432 | 3/1980 | Miki et al. | |
| 4,505,484 | 3/1985 | Ohkuma et al. | 277/94 |
| 4,695,062 | 9/1987 | Dreschmann et al. | 277/562 X |
| 4,865,471 | 9/1989 | Miyazaki | 384/482 |
| 5,037,213 | 8/1991 | Uchida et al. | 384/484 X |

FOREIGN PATENT DOCUMENTS

| | | | |
|---|---|---|---|
| 212367 | 1/1958 | Australia | 384/486 |
| 2731764 | 1/1978 | Germany | |
| 7833808 | 10/1983 | Germany | |

*Primary Examiner*—Thomas R. Hannon
*Attorney, Agent, or Firm*—Adams & Wilks

[57] ABSTRACT

A sealing device for a bearing comprises a first bearing member having a peripheral shoulder portion, a second bearing member, and a seal member integrally connected to the second bearing member and having an inner peripheral portion and an inner peripheral seal lip extending from the inner peripheral portion. The inner peripheral seal lip has first projections extending in a first direction towards a surface of the peripheral shoulder portion of the first bearing member and second projections extending in a second direction opposite the first direction. One of the first projections is initially disposed in contact with the surface of the peripheral shoulder portion of the first bearing member. When the first projection of the inner peripheral seal lip which is initially in contact with the surface of the peripheral shoulder portion of the first bearing member undergoes a predetermined amount of wear, at least one of the other first projections of the inner peripheral seal lip comes in contact with the surface of the peripheral shoulder portion of the first bearing member to maintain an adequate seal therebetween.

19 Claims, 2 Drawing Sheets

SEALING DEVICE FOR ROLLER BEARING

FIELD OF THE INVENTION

The present invention relates to a sealing device for a roller bearing capable of securing a sealability for long periods.

DESCRIPTION OF PRIOR ART

A conventional sealing device for a roller bearing has been known, for example, from U.S. Pat. No. 4,191,432 filed by the present Applicant issued on Mar. 4, 1980. The construction of this sealing device for a roller bearing will be described with reference to FIG. 4. A shoulder 41 of an inner ring 40 of a roller bearing is provided with a peripheral shoulder portion 42. An annulus 44 secured to an outer ring 43 is provided with a soft inner peripheral seal lip 45 extending along a side 47 of the peripheral shoulder portion 42. This inner peripheral seal lip 45 is formed at its extreme end with an inner lip 46. A bearing is sealed in contact with the inner lip 46 in the side 47 of the peripheral shoulder portion 42.

In the sealing device for a roller bearing as described above, there involves a problem in an interference with respect to the side 47 of the peripheral shoulder of the inner lip 46 of the inner seal lip 45. For example, in the case where the interference becomes excessively large in terms of unevenness of dimension of the inner lip 46 or the displacement of the inner ring, the wear of the inner lip 46 occurs early, resulting in a surface contact at the inner surface in the inner peripheral seal lip 45 not contact of only the inner lip 46 to lower the lip sliding surface pressure so that the foreign matter such as water likely enters into the bearing from outside of the bearing. Accordingly, it is necessary to fully strictly manage the interference of the inner lip 46.

SUMMARY OF THE INVENTION

It is an object of the present invention to provide a sealing device for a roller bearing capable of securing a sealability for long periods even if the wear of a lip due to the excessively large interference should occur.

A sealing device for a roller bearing according to the present invention comprises a peripheral shoulder portion provided on a shoulder of an inner ring; an inner peripheral seal lip extending from an inner peripheral portion of a seal annulus secured to an outer ring in a diametrical direction along the side of said peripheral shoulder portion and having a part thereof placed in contact with the side of said peripheral shoulder portion, said inner peripheral seal lip having a plurality of inner lips extending in a direction of the side of said peripheral shoulder portion, a plurality of outer lips formed to extend from a base of each inner lip in a direction opposite to the side of said peripheral shoulder portion, and a connecting portion formed to extend axially obliquely outwardly between the inner peripheral portion of said seal annulus and the inner lip and between the inner lips; and sealing means in which only the inner lip at the extreme end out of the inner lips comes in contact with the side of said peripheral shoulder portion and comes in contact with said peripheral shoulder portion first after the inner lip at the extreme end out of the other inner lips has been work by a predetermined amount.

By the construction described above, the present invention causes the inner peripheral seal lip to enable an increase of an axial flexure amount at the extreme end of the inner peripheral seal lip by a plurality of base points. Further, the wear of the inner lip at the extreme end due to the excessively large interference caused by the axial displacement of the inner ring is hard to occur. Moreover, even if the wear should occur, the other inner lips come in contact with the side of the peripheral shoulder portion after a predetermined amount of wear to maintain the sealability.

DETAILED DESCRIPTION OF THE PREFERRED EMBODIMENTS

Figure 1:
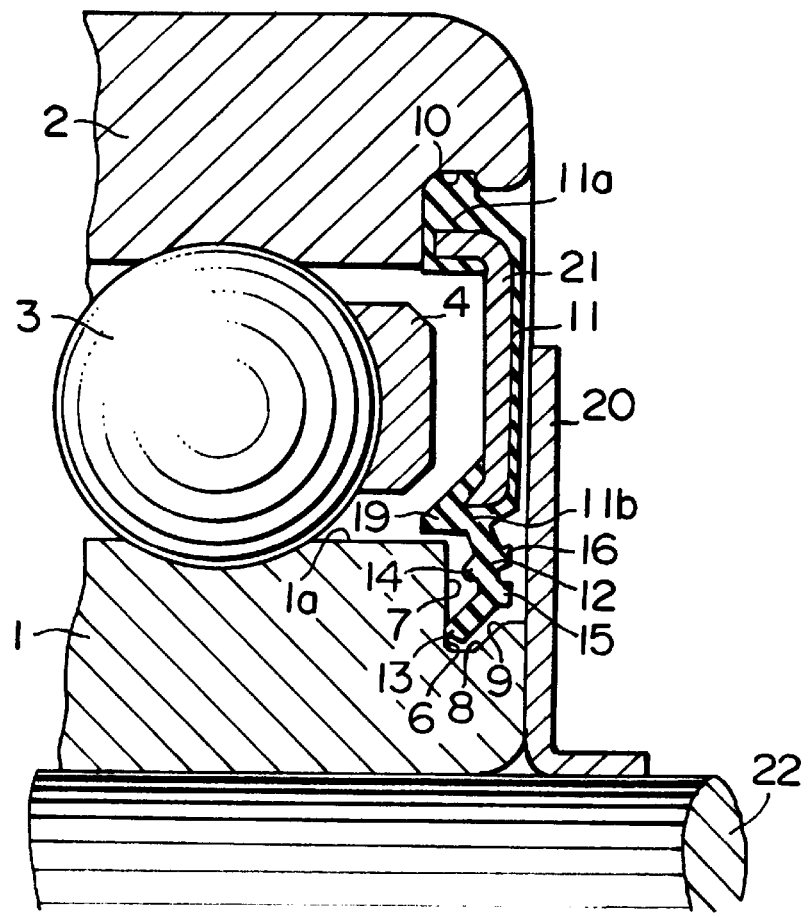
FIG. 1 is a longitudinal sectional view of main parts showing one embodiment of a sealing device for a roller bearing according to the present invention.
Figure 2:
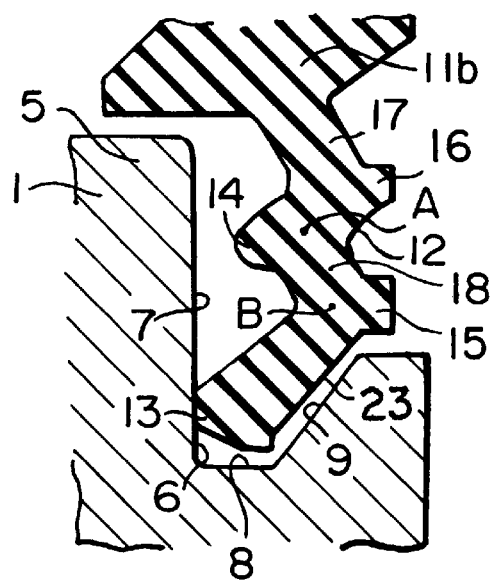
FIG. 2 is an enlarged view of the main parts shown in FIG. 1.

The embodiment of the present invention will be described hereinafter with reference to FIGS. 1 and 2. A ball 3 is disposed in a rolling manner between a first bearing member or inner ring 1 and a second bearing member or outer ring 2 through a retainer 4. The inner ring 1 is formed in its shoulder 5 with an inner side 7 extending in a diametrical direction so as to be perpendicular to an axis, a bottom surface 8 parallel with the axis, and a peripheral shoulder portion 6 having a substantially J-shape in section formed from a taper surface 9 whose diameter increases toward the end of the inner ring 1. The outer ring 2 is formed in an inner peripheral end with a peripheral groove 10, and an outer peripheral portion 11a of a seal annulus 11 is secured to the peripheral groove 10. This seal annulus 11 is constituted from an elastic element such as rubber, in which a diametrically extending metallic core 21 is embedded. The seal annulus 11 is provided in its inner peripheral portion 11b with an axial lip 19 extending inwardly of a bearing to form a labyrinth sealing portion with an outer peripheral surface 1a of the inner ring 1. There is formed a soft inner peripheral seal lip 12 formed of an elastic element which extends on the axial lip 19 and extends in a diametrical direction along the side 7 of the peripheral shoulder 6.

The inner peripheral seal lip 12 of the seal annulus 11 is formed in its extreme end and intermediate portion with a first annular projection or inner lip 13 and a second annular projection or inner lip 14 extending in a direction of the side 7 of the peripheral shoulder portion 6. A first outer lip 15 and a second outer lip 16 are formed extending in the direction opposite the side 7 of the peripheral shoulder portion 6 from proximal portions of the first inner lip 13 and the second inner lip 14. Connecting portions 17 and 18 between the inner peripheral portion 11b and the second inner lip 14 of the seal annulus 11 and between the second inner lip 14 and the first inner lip 13 are made to be thin in wall-thickness and formed to extend axially obliquely outwardly. Out of the inner lips, only the first inner lip 13 at the extreme end always comes in contact with the side 7 of the peripheral shoulder portion 6 and is sealed. Other second inner lips 14 are first not in contact with the side 7 of the peripheral shoulder portion 6 and come in contact with the side 7 of the peripheral shoulder portion 6 first after the first inner lip 13 has been worn by a predetermined amount.

That is to say, when the wear of the first inner lip 13 progresses and the lip sliding surface pressure lowers, the second inner lip 14 comes in contact with the side 7 of the peripheral shoulder portion 6 so that the sealability is maintained. This second inner lip 14 prevents a rapid variation of torque when it begins to contact with the side 7 of the peripheral shoulder portion 6 as a circular shape in section. The second inner lip 14 forms a labyrinth sealing portion relative to the side 7 till it comes in contact with the side 7 of the peripheral shoulder portion 6.

Figure 3:
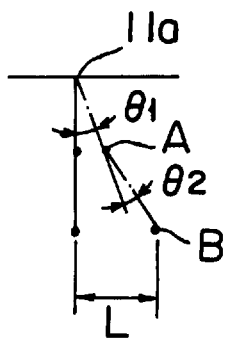
FIG. 3 is a schematic view of a flexure of an inner peripheral seal lip shown in FIG. 1.
Figure 4:
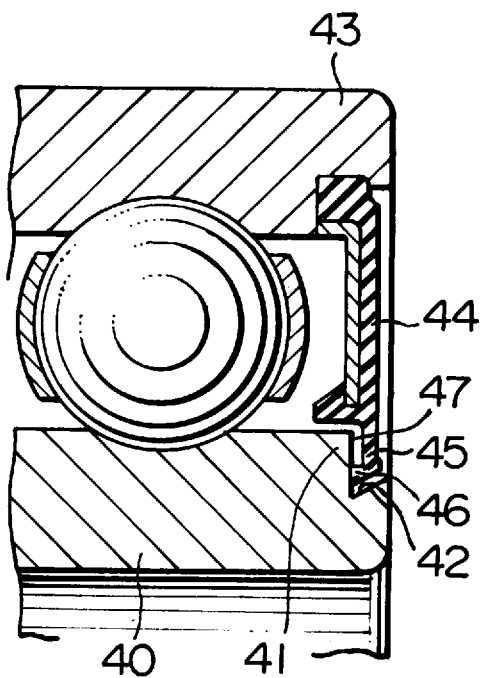
FIG. 4 is a longitudinal sectional view of a conventional sealing device for a roller bearing.

Since the lips are connected by the thin connecting portions 17, 18 which are inclined axially obliquely outwardly, the connecting portions 17, 18 can be sequentially easily flexed outwardly of the bearing with a thick-wall portion A between the inner peripheral portion 11b of the seal annulus 11, the second inner lip 14 and the second outer lip 16 and a thick-wall portion B between the first inner lip 13 and the first outer lip 15 being base points. Accordingly, since a large axial flexure amount of the first inner lip 13 is provided, it can correspond to the axial displacement of the inner ring 1. This will be explained with reference to FIG. 3, a schematic view. That is, since the inner peripheral seal lip 12 is flexed at angles of $\phi 1$ and $\phi 2$ at base points A and B, a large axial flexure amount L of the first inner lip 13 is easily provided. In FIG. 3, the solid line indicates an original position of the inner peripheral seal lip 12, and the broken line indicates a flexure position.

Accordingly, a proper value of an interference corresponding to the side 7 of the peripheral shoulder portion 6 of the first inner lip 13 is easily maintained. The connecting portions 17 and 18 are formed in parallel and can correspond to the axial displacement of the inner ring 1 or the like in a further stable manner.

Further, when the inner peripheral surface of the first inner lip 13 is formed on a taper surface 23 opposite to the taper surface 9 of the peripheral shoulder portion 6 to form a labyrinth sealing portion between both the taper surfaces 9 and 23, the sealability is further improved.

Furthermore, when a third bearing member member such as a slinger 20 pressed and secured to a shaft 22 provided on the inner ring 1 is arranged, a labyrinth sealing portion is formed between the member 20 and the outer lips 15, 16 to further improve the sealing effect.

If a labyrinth sealing portion is formed between the inner lips 13, 14 and the outer lips 15, 16 of the inner peripheral seal lip 12, the sealing effect is further improved.

It is to be noted that the inner lips 13, 14 and the outer lips 15, 16 of the inner peripheral seal lip 12 need not be limited to two but a plurality of them will suffice.

We claim:

1. A sealing device for a roller bearing, comprising: an inner ring having a peripheral shoulder portion; an outer ring; a seal annulus secured to the outer ring in a diametrical direction along a side of the peripheral shoulder portion of the inner ring, the seal annulus having an inner peripheral portion and an inner peripheral seal lip extending from the inner peripheral portion, the inner peripheral seal lip having a plurality of inner lips extending in a direction of a side of the peripheral shoulder portion of the inner ring, a plurality of outer lips extending from a base of each of the inner lips in a direction opposite to the side of the peripheral shoulder portion of the inner ring, connecting portions extending between the inner peripheral portion of the seal annulus and the inner lips, one of the inner lips being initially disposed in contact with the side of the peripheral shoulder portion of the inner ring; wherein when the inner lip initially in contact with the side of the peripheral shoulder portion of the inner ring has been worn by a predetermined amount, at least one of the other inner lips comes in contact with the side of the peripheral shoulder portion of the inner ring.

2. A sealing device for a roller bearing according to claim 1; wherein the connecting portions extend parallel to each other.

3. A sealing device for a roller bearing according to claim 1; wherein the side of the peripheral surface portion of the inner ring and the inner lips, other than the inner lip initially in contact with the side of the peripheral surface portion of the inner ring, form a labyrinth sealing portion.

4. A sealing device for a roller bearing according to claim 3; further comprising a member disposed in juxtaposed relation to the inner ring; and wherein the member and the outer lips form a labyrinth sealing portion.

5. A sealing device for a roller bearing according to claim 1; wherein the inner lip of the inner peripheral seal lip initially in contact with the side of the peripheral shoulder portion of the inner ring is disposed at a terminal end of the inner peripheral seal lip.

6. A sealing device for a roller bearing according to claim 1; wherein the connecting portions comprise a first connecting portion extending axially obliquely outwardly between the inner peripheral portion of the inner ring and one of the inner lips, and a second connecting portion extending axially obliquely outwardly between the inner lips.

7. A sealing device for a roller bearing according to claim 6; wherein the first and second connecting portions extend parallel to each other.

8. A sealing device for a bearing, comprising: a first bearing member having a peripheral shoulder portion; a second bearing member; a seal member integrally connected to the second bearing member and having an inner peripheral portion and an inner peripheral seal lip extending from the inner peripheral portion, the inner peripheral seal lip having a plurality of first projections extending in a first direction towards a surface of the peripheral shoulder portion of the first bearing member and a plurality of second projections extending in a second direction opposite the first direction, one of the first projections being initially disposed in contact with the surface of the peripheral shoulder portion of the first bearing member; wherein when the first projection of the inner peripheral seal lip initially in contact with the surface of the peripheral shoulder portion of the first bearing member undergoes a predetermined amount of wear, at least one of the other first projections of the inner peripheral seal lip comes in contact with the surface of the peripheral shoulder portion of the first bearing member.

9. A sealing device for a bearing according to claim 8; wherein the seal member is generally annular in cross-section.

10. A sealing device for a bearing according to claim 8; wherein the second projections of the inner peripheral seal lip extend from respective ones of the base portions of the first projections of the inner seal lip.

11. A sealing device for a bearing according to claim 8; further comprising a plurality of connecting portions disposed between the inner peripheral portion of the first bearing member and the first projections of the inner peripheral seal lip.

12. A sealing device for a bearing according to claim 11; wherein the connecting portions comprise a first connecting portion extending axially obliquely outwardly between the inner peripheral portion of the first bearing member and one of the first projections, and a second connecting portion extending axially obliquely outwardly between the first projections.

13. A sealing device for a bearing according to claim 12; wherein the first and second connecting portions extend parallel to each other.

14. A sealing device for a bearing according to claim 8; wherein the first projection of the inner peripheral seal lip initially in contact with the surface of the peripheral shoulder portion of the first bearing member is disposed at a terminal end of the inner peripheral seal lip.

15. A sealing device for a bearing according to claim 8; wherein the seal member is connected to the second bearing member in a diametrical direction along the surface of the peripheral shoulder portion of the first bearing member.

16. A sealing device for a bearing according to claim 8; wherein the surface of the peripheral surface portion of the first bearing member and the first projections of the inner peripheral seal lip, other than the first projection initially in contact with the surface of the peripheral surface portion of the first bearing member, form a labyrinth defining a sealing passage for receiving a lubricant.

17. A sealing device for a bearing according to claim 8; further comprising a third bearing member disposed in juxtaposed relation to the first bearing member; and wherein the third bearing member and the second projections of the inner peripheral seal lip form a labyrinth defining a sealing passage for receiving a lubricant.

18. A seal assembly for a bearing, comprising: means defining a space having first and second rotational bearing members at opposite sides thereof; and sealing means for sealing the space, the sealing means including an outer peripheral portion integrally connected to the second rotational bearing member, an inner peripheral portion, and a seal lip extending from the inner peripheral portion, the seal lip having a plurality of first projections extending towards a peripheral shoulder portion of the first rotational bearing member and a plurality of second projections extending away from the peripheral shoulder portion of the first rotational bearing member, one of the first projections being initially in sealing contact with the peripheral shoulder portion of the first rotational bearing member and being subjected to wear during rotation of the first and second rotational bearing members; wherein when the first projection of the inner peripheral seal lip initially in sealing contact with the peripheral shoulder portion of the first rotational bearing member undergoes a predetermined amount of wear, at least one of the other first projections of the inner peripheral seal lip comes in contact with the peripheral shoulder portion of the first rotational bearing member to provide a seal therebetween.

19. A sealing device for a bearing according to claim 18; wherein the sealing means further includes a first connecting portion disposed between the inner peripheral portion and one of the first projections, and a second connecting portion disposed parallel to the first connecting portion and between two of the first projections.

\* \* \* \* \*